United States Patent [19]

Moffitt

[11] 4,300,231
[45] Nov. 10, 1981

[54] DIGITAL SYSTEM ERROR CORRECTION ARRANGEMENT

[75] Inventor: Bryan S. Moffitt, Eatontown, N.J.

[73] Assignee: Bell Telephone Laboratories, Incorporated, Murray Hill, N.J.

[21] Appl. No.: 108,847

[22] Filed: Dec. 31, 1979

[51] Int. Cl.³ .............................................. H04J 3/02
[52] U.S. Cl. ....................................... 370/86; 370/62; 371/30; 179/18 BC
[58] Field of Search .................... 370/86, 89, 6, 7, 62; 328/162; 371/30; 179/18 BC

[56] References Cited

U.S. PATENT DOCUMENTS

| | | | |
|---|---|---|---|
| 3,934,091 | 1/1976 | Stidham | 370/6 |
| 4,002,842 | 1/1977 | Meyr et al. | 370/86 |
| 4,048,449 | 9/1977 | Natebusch | 179/18 BC |
| 4,049,921 | 9/1977 | Zwack | 179/18 BC |

OTHER PUBLICATIONS

Intel Corp. PCM Codec #2911, Jun. 1978, pp. 1-11.
Digital Processing of Signals, 1969, Discrete Linear Systems, pp. 1-11, by Bernard Gold et al.
IEEE Trans. on Communications, May 1978, A Twelve-Channel Digital Echo Canceler, vol. Com-26, No. 5, Duttweiller.

Primary Examiner—Douglas W. Olms
Attorney, Agent, or Firm—David H. Tannenbaum

[57] ABSTRACT

There is disclosed an arrangement for removing error signals from a digital loop. A binary subtraction circuit is inserted in the loop and all signals passing through the circuit are reduced by a value which is dependent upon the magnitude of the accumulated signal. This arrangement serves to remove any accumulated DC offset bias from the digital signal.

7 Claims, 8 Drawing Figures

LOOP DATA SYSTEM 10

DELTA-MOD CONVERSION SYSTEM 20

DECREMENTING ERROR CONTROL CCT
FOR LOOP DATA SYSTEM

DECREMENTING ERROR CONTROL CCT
FOR LOOP DATA SYSTEM

| TIME | CHANGE (Δ) FROM SAMPLE TO SAMPLE | SAMPLES WITHOUT AUTO ZERO | PREVIOUS SAMPLE + Δ | AUTO ZERO DECREMENT | SAMPLES WITH AUTO ZERO |
|---|---|---|---|---|---|
| 0 |  | 0 |  |  | 0 |
| T | 100 | 100 | 100 | −5 | 95 |
| 2T | 50 | 150 | 145 | −5 | 140 |
| 3T | −50 | 100 | 90 | −5 | 85 |
| 4T | −100 | 0 | −15 | +5 | −10 |
| 5T | −100 | −100 | −110 | +5 | −105 |
| 6T | −50 | −150 | −155 | +5 | −150 |
| 7T | 50 | −100 | −100 | +5 | −95 |
| 8T | 100 | 0 | +5 | −5 | 0 |

↑———— COMPARE ————↑

| TIME | CHANGE (Δ) FROM SAMPLE TO SAMPLE | SAMPLES WITHOUT AUTO ZERO | PREVIOUS SAMPLE + Δ | AUTO ZERO DECREMENT | SAMPLES WITH AUTO ZERO |
|---|---|---|---|---|---|
| 0 | | 70 | | | 70 |
| T | 100 | 170 | 170 | −5 | 165 |
| 2T | 50 | 220 | 215 | −5 | 210 |
| 3T | −50 | 170 | 160 | −5 | 155 |
| 4T | −100 | 70 | 55 | −5 | 50 |
| 5T | −100 | −30 | −50 | +5 | −45 |
| 6T | −50 | −80 | −95 | +5 | −90 |
| 7T | 50 | −30 | −40 | +5 | −35 |
| 8T | 100 | 70 | 65 | −5 | 60 |

────── COMPARE ──────

DIGITAL SYSTEM ERROR CORRECTION ARRANGEMENT

BACKGROUND OF THE INVENTION

1. Field of the Invention

This invention relates to an error control circuit for use in digital communication systems.

2. Description of the Prior Art

Digital communication systems of the continuous loop variety are now being looked to for use in situations where the various stations connected to the loop share a close physical proximity to each other. In some applications such systems are called closed-ring time division multiplex systems and may use pulse code modulation. Such a system is shown in U.S. Pat. No. 4,049,921 issued Sept. 20, 1977 to Edward Zwack, which patent is hereby incorporated by reference herein as if reproduced in full.

The Zwack patent discloses a closed loop communication system which allows conferencing between several stations. The stations are connected to the digital loop by an interface circuit which operates to add the instantaneous digital or analog signal onto the conference bus and to remove from the bus that portion of the combined signal which had been placed on the bus via the same interface circuit during the last cycle. The system operates with a delay circuit where the signal from the station is delayed one full cycle at the interface circuit and compared to the incoming signal for the purpose of subtracting from the incoming signal the portion of that combined signal which had been placed on the loop in the previous cycle. A problem exists with such systems in that, while the interface circuits operate to remove signals from the loop which were provided from the associated station nothing protects the loop from signals which have been erroneously placed thereon. The problem stems from the fact that the loop relies upon each interface circuit to remove from the loop those signals placed on the loop by that interface. However, those signals which, for one reason or another, enter the loop because of an error condition remain on the loop and, unless removed, are equivalent to a DC component. A DC component in the signal gives an undesirable shift of the signal toward its digital limits. A signal shifted beyond its limit produces overflow, an unacceptable situation analogous to saturation of a linear analog system.

In copending application of Baugh there is disclosed an arrangement for controlling errors in such a loop system. The Baugh disclosure is directed to a linear analog approach to the problem. Thus one object of my invention is to use a technique more in keeping with the digital nature of the communication signals. This results in a time and cost efficient alternative to loop error correction and also overcomes the "deadband" decay problem caused by finite resolution of digital signals.

SUMMARY OF THE INVENTION

My invention, as well as that of Baugh, takes advantage of the fact that, in closed loop type systems, errors typically appear on the communication bus either from the station or from random signals on the loop. In the general situation of such systems, broken wires or long term cable failures cannot be corrected and are not considered. Thus, reliance must be placed on each station interface circuit performing to remove from the bus those signals placed on the bus from the associated station and the only errors which remain on the bus are those that are generated in random fashion.

Advantage is taken of this fact by incorporating in the closed loop a correction circuit through which all the communication signals pass. The circuit reduces the instantaneous signal by a fixed amount by either adding or subtracting that amount from the signal depending on the sign of the signal. This procedure ensures that the resultant signal is decremented toward zero. By decrementing the data toward zero at chosen passes around the loop, any one-time error that would have remained on the loop now eventually approaches zero. For this effect, the correction circuit is called an auto zero. Sinusoidal data introduced by the updating circuits also approaches zero but, if the rate toward zero is low enough and the sinusoid's frequency high enough, the error is small and also tends to cancel between opposite half cycles. This arrangement creates a small amount of distortion but no error accumulates because the decrement is in opposite directions for opposite half cycles.

Accordingly, it is a feature of the invention to provide an insertable closed loop control module for digitally reducing the random errors of a closed loop communication system by repetitively subtracting a value from all signals passing through the control module with the sign of the subtraction being dependent upon the actual signal.

BRIEF DESCRIPTION OF THE DRAWING

These features and objects as well as others will be more fully appreciated from a review of the drawing in which.

GENERAL DESCRIPTION

Figure 1:
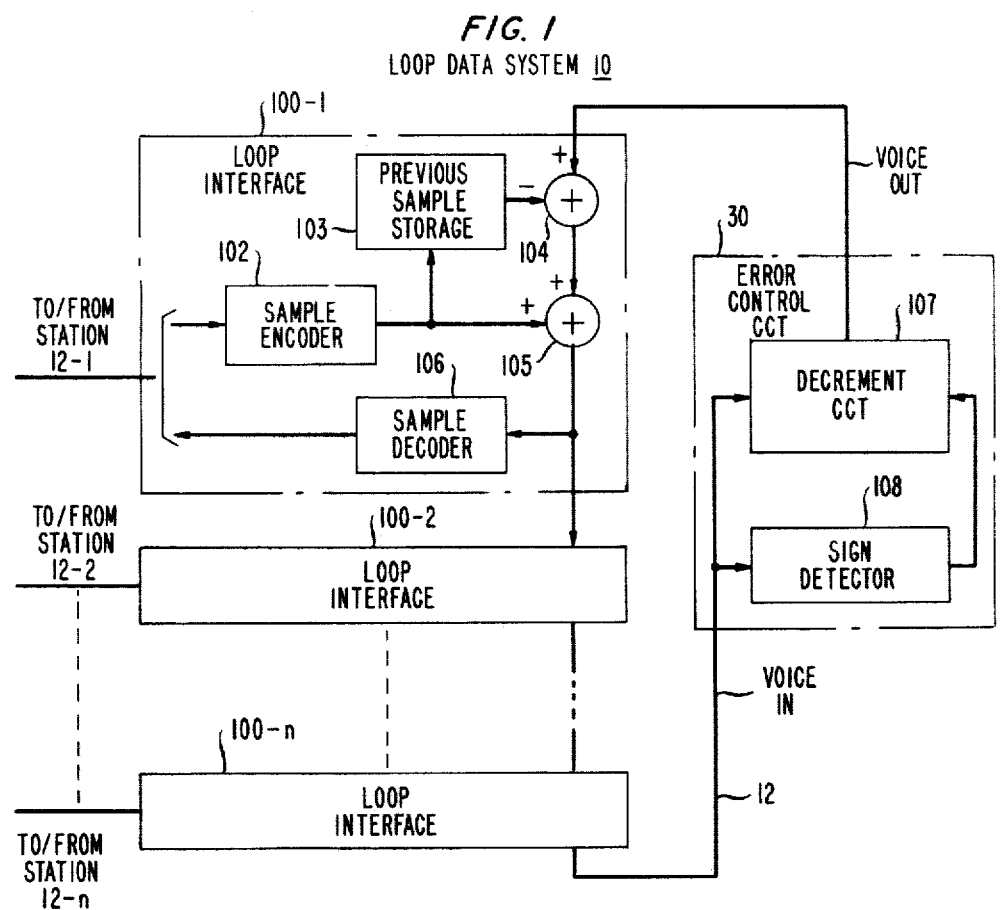
FIG. 1 is a block diagram of a closed loop communication system showing detail of a loop interface and the error correction circuit.

FIG. 1 shows a generic digital loop architecture for transmitting digital voice information between stations connected to loop 12. The stations are connected to loop interface circuits 100-1 through 100-n in sequential order such that the information on loop bus 12 passes by each loop interface circuit in a sequential manner. The interface circuits may be any type operable for processing information, either analog or digital, between a communication line and the loop. One such circuit for digital loops is shown in the above-mentioned U.S. patent to Zwack. Also connected onto this bus is an error control circuit 30 which processes the voice information circulating on the closed loop bus to compensate for any errors that are introduced into the digitized voice signals.

When the closed loop bus architecture of FIG. 1 is implemented with digital technology, the voice signals circulating on the closed loop bus and passing through each of the loop interface circuitry 100-1 through 100-n, is represented by a successive digital voice samples. In order to implement either extension telephones or conferencing features, the voice sample circulating on the loop must represent the instantaneous sum of all of the parties in a given telephone conversation. Thus, as the voice sample passes a loop interface circuit of a station active in that conversation, the sum of all talkers must be updated to represent the new instantaneous value of that voice signal from the station connected to the loop interface.

For example, if the incoming instantaneous voice signal on the loop has value 147, and if the previous talker value of this station was 52 and if the present talker value of this station is 312, then the outgoing accumulated voice sample from the loop interface is 407 (147−52+312). If the digital representation of the sum of the speakers in the conversation is different from the sum from all of the active interface circuits then the signal is in error. This error will not be removed by any of the active interface circuits and will circulate around the closed loop bus indefinitely. The function of error control circuit 30 is to process the voice signal in such a way as to eventually reduce the error on the communication signal without significantly distorting that signal.

Figures 5, 6:
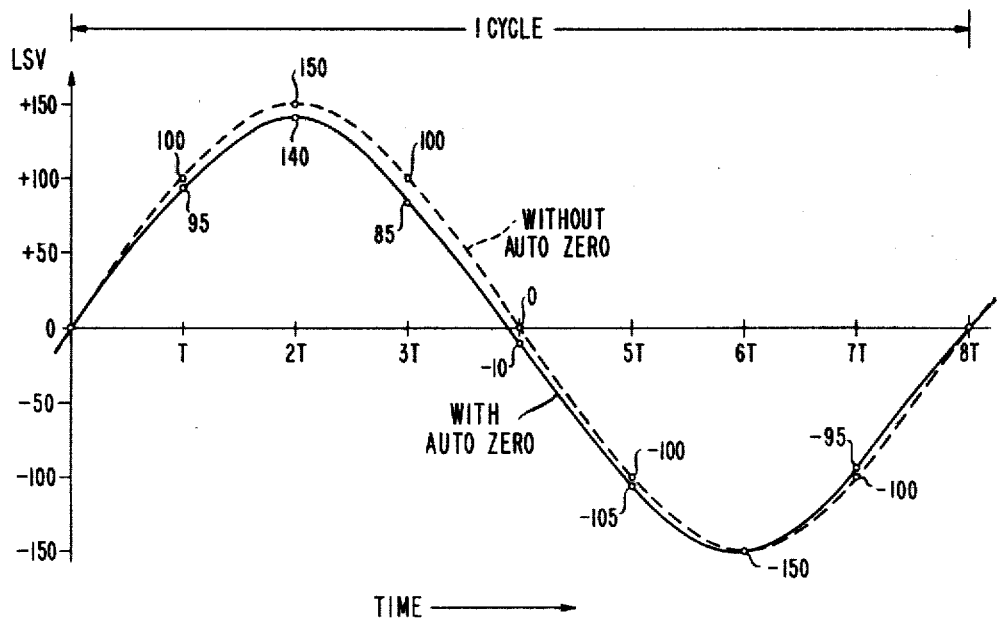
FIGS. 5-8 show in graph form examples of error controlled sinusoidal signals.

FIGS. 5–6 illustrates the Auto zero effect on a sinusoidal signal with no constant offset error. From this, the Auto zero effect on errors can be more easily explained. For the waveform shown in FIG. 6 (broken line) eight samples are generated. The change ($\Delta$) from each sample to its following sample is listed in the chart of FIG. 5. Each new sample is a running total resulting from accumulating all the previous changes. The samples are also calculated with the effect of an Auto zero having a decrement of five on every sample interval. The new waveform is shown in FIG. 6 (solid line) and clearly shows sample errors (waveform distortion) being generated. A more important point to notice is that, over a full cycle, the error caused by the decrements has canceled out and the cycle starts out at zero again at sample time 8T. This results in no cumulative error for a signal with no constant offset error since half of the decrements are positive and half negative.

Figures 7, 8:
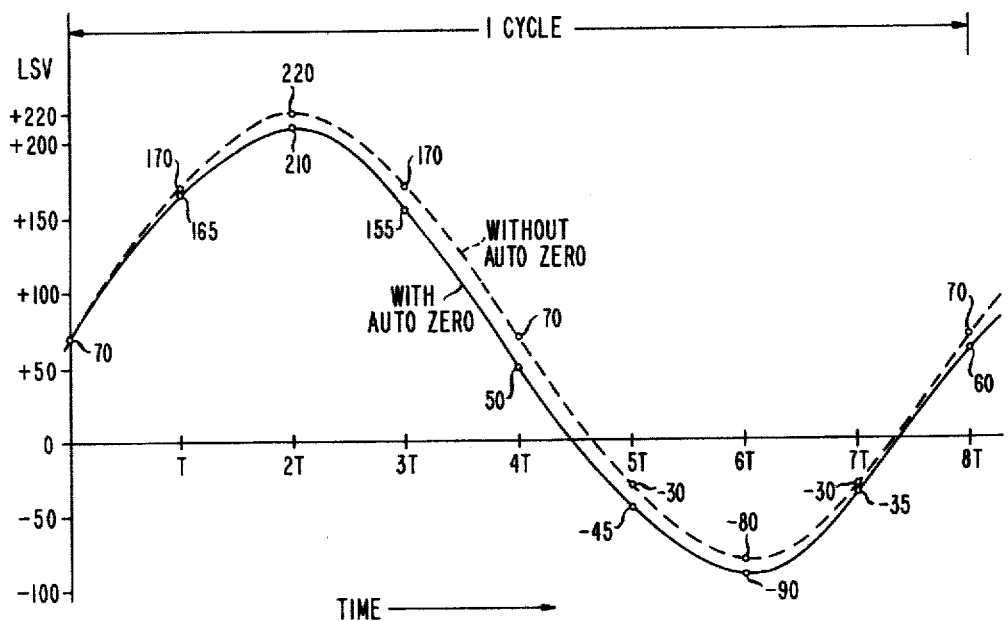

In situations, such as shown in FIG. 8, where an error has caused the sinusoidal signal (broken line) to contain a constant positive offset, most (or all) of the samples would be positive so most (or all) of the Auto zero decrements would be negative. This is shown in FIG. 7 where five of the eight decrements are negative. The waveform with the Auto zero is also shown in FIG. 8 (solid line) illustrating the shift of the waveform toward zero. When the waveform eventually centers around zero, each cycle will receive as many positive decrements as negative decrements and will no longer shift, as has been illustrated in FIG. 6.

Figure 2:
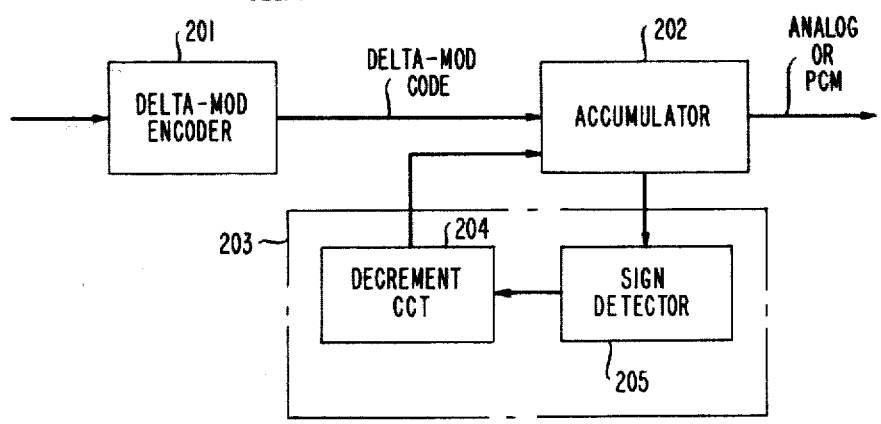
FIG. 2 is a block diagram of an accumulation type system.

FIG. 2 shows a delta-mod configuration which is an alternative use of my concept in a different environment.

DETAILED DESCRIPTION

The magnitude reduction technique utilized within error control circuit 30 automatically removes errors from the digital representation of the voice signal circulating continuously around the closed loop bus. The technique of magnitude reduction guarantees that a constant error signal superimposed on the voice signal will eventually be removed and the voice signal centered around zero.

Figure 3:
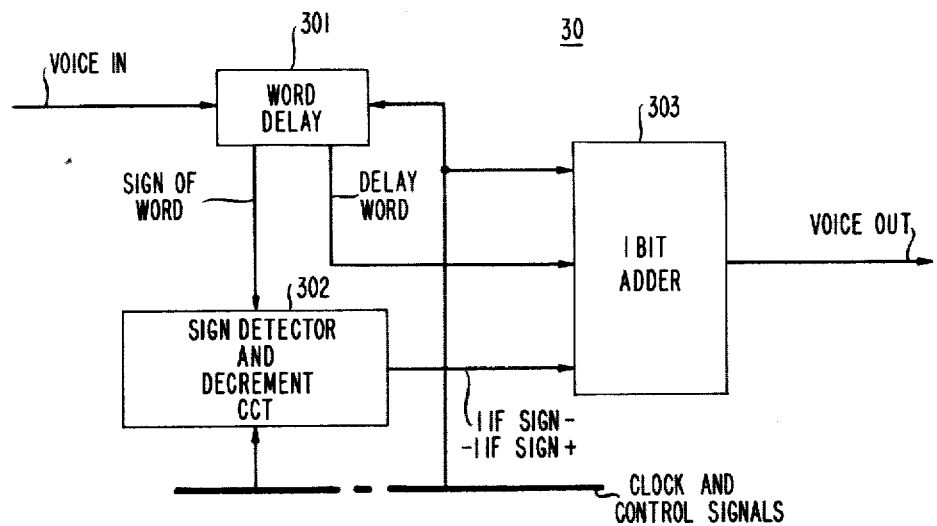
FIG. 3 is a block diagram of the decrementing error control circuit.

FIG. 3 shows a block diagram of the decrementing error control technique for implementing magnitude reduction error control circuit 30. The technique works by decrementing the magnitude by a fixed number, for example, one. Since the incoming digitized voice sample has its magnitude encoded as a two's complement integer value, the decrementing of the signal takes place by adding or subtracting unity from its present value.

The block diagram consists of four components, a word delay 301, a decrement generator circuit 302 and a one bit adder 303. Several clocking control signals provide the necessary sequencing of the operations. The decrement circuit 302 presents a value of one with the polarity opposite to the incoming voice sample to the serial adder 303 which implements the decrementing.

Figure 4:
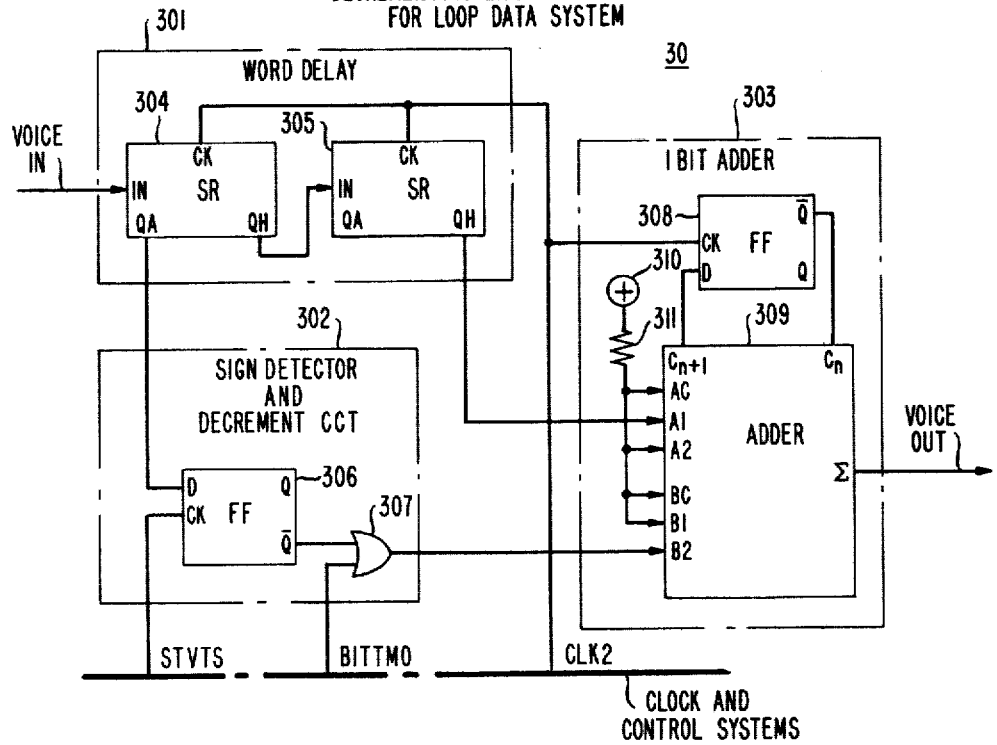
FIG. 4 is a detailed drawing in schematic form of the decrementing error control circuit.

FIG. 4 shows a circuit realization of the functional block diagram of FIG. 3. Assume the digitized voice sample is encoded in two's complement form of 16-bits with the least significant bit arriving first. This serial digital stream arrives at shift registers 304, 305 and is sequentially shifted through word delay 301 by means of the clock signal CLK2. The sign bit is clocked into flip-flop 306 during the bit time in which the shifting voice sample has its sign bit at the QA output of shift register 304. The control signal STVTS strobes the sign into flip-flop 306 at that time.

Decrement circuit 302 generates a plus one or minus one input by means of OR gate 307 and the control signal BITTMO. The output of gate 307 is a 16-bit two's complement representation of plus one or minus one depending upon whether the Q output of flip-flop 306 is a one or a zero. If the Q output is one, the output of gate 307 will always be high representing a minus one. If the Q is zero, the output of gate 307 will be high only during the least significant bit time and low thereafter. This represents a plus one.

One bit adder circuit 303 consists of an adder 309 and a carry save flip-flop 308 to form a one bit serial adder whose output is the output digital voice sample. The inputs to the adder are A1 and B2. Thus, the adder performs the sum of the two's complement numbers presented at A1 and B2 thereby subtracting a fixed number from the voice (signal) output. The sign of this fixed number is the opposite of the sign of the signal. Thus, the correction value depends upon the input signal.

VARIABLE INCREMENTAL MAGNITUDE

In situations where the error is large it may be desired to use a variable magnitude increment for one or more of the error change signals. Doing this will temporarily increase the waveform distortion but will tend to bring the signal back into proper focus sooner. To determine when a larger increment is suitable, it will be necessary to monitor other parameters of the signal as well as the sign. This can be done by searching for large offset errors indicated by patterns in the most recent increment corrections. It can also be done by examining the difference between most recent negative and positive peaks in the signal. The increment change is easily implemented by forcing BITTMO to 1 for more than just the least significant bit time and replacing the Gate 307 with an exclusive OR gate. A method for reducing the correction rate is by skipping the increment for certain samples on a periodic basis.

Conclusion

While much of the discussion in the description has been centered around the use with a sinusoid it must be understood that the inventive concept may be used for any periodic signal with no DC component. The concept allows for wide selection of either the decrementing period or the decrementing magnitude for choosing an optimum tradeoff between signal distortion and recovery speed. To this end one skilled in the art may advantageously use the concepts taught herein in varied system applications without departing from the spirit and scope of the invention.

I claim:

1. An error correction arrangement for use in a continuous loop communication system where a plurality of communication stations have access thereto and wherein the composite communication signal transmitted around said loop at any particular time may be represented as an accumulated sum of the individual binary digital representations of instantaneous values of said signal, said error correction circuit comprising means for temporarily storing each said composite accumulated sum, means for determining the sign of the magnitude of each said stored accumulated sum, signal modifying means for subtracting a predetermined digital value from said temporarily stored accumulated sum at selected periodic intervals, and means for establishing the sign of said predetermined digital value in accordance with said determined sign of each said stored accumulated sum.

2. An error correction circuit for use in a continuous loop communication system where a plurality of communication stations have access thereto via interface circuits associated with each station, said error correction circuit comprising means for sampling the combined loop signal at a particular location within said loop, means for establishing the sign of a predetermined digital error control signal, means for modifying said sampled signal by said established predetermined digital error control signal so as to provide a new combined signal, and means for substituting on said loop said new combined signal for said sampled signal.

3. The invention set forth in claim 2 wherein said predetermined digital error signal has a fixed value of unity and wherein said sign is dependent upon the sign of said sampled signal.

4. In combination, a communication system wherein a plurality of interface circuits are operative to place communications on a common bus interconnecting said interface circuits and wherein said communications pass through said interface circuits in sequential fashion, an error control circuit inserted in said bus such that all said communications pass through said error control circuit, means for sampling the communication signal passing through said circuit, means for determining the sign of said sampled signal, means for establishing a fixed magnitude digital decrementing signal, the sign of said decrementing signal being established inversely to said determined sign of said sample, means for modifying said sample signal by said fixed magnitude digital decrementing signal so as to produce a new combined signal, and means for substituting on said bus said produced new signal for said sampled signal.

5. An error correction circuit for use in a continuous loop communication system where a plurality of digital stations have access thereto and where in communication signals on said loop at any one time comprise a discrete composite digital signal value, said error correction circuit comprising a shift register for temporarily storing each said composite signal values, means for determining the sign of said stored composite signal value, an adder, means for establishing the sign of a predetermined decrementing digital signal value, means including said adder, for combining said stored composite signal with said established decrementing signal value in accordance with said determined sign of said stored composite signal value to produce a new composite signal, and means for substituting on said bus said new composite signal for said temporarily stored composite signal.

6. The invention set forth in claim 5 further comprising means for determining the error offset of said stored composite signal and wherein said established decrementing signal is controlled by said determined error offset.

7. The invention set forth in claim 5 wherein said established decrementing signal is periodically zero.

* * * * *